United States Patent Office 2,803,599

Patented Aug. 20, 1957

2,803,599

GAMMA RAY POLYMERIZATION OF UNSATURATED NITROGEN COMPOUNDS

Thomas S. Tutwiler, Watchung, William C. Hollyday, Jr., Fanwood, James F. Black, Roselle, and Henry R. Ertelt, Fanwood, N. J., assignors to Esso Research and Engineering Company, a corporation of Delaware No Drawing. Application October 1, 1954, Serial No. 459,846

5 Claims. (Cl. 204—158)

This invention relates to a new process for the preparation of lubricating oil additives and to lubricating oil compositions containing them. Particularly the invention relates to a new process for the formation of viscosity index improvers by polymerization of unsaturated nitrogen compounds and copolymerization of these materials with unsaturated esters.

Copolymers incorporating unsaturated nitrogen compounds with other polymerizable materials, specifically esters of unsaturated materials, are known in the art. U. S. Patent 2,387,501, issued October 23, 1945, to Dietrich, teaches the polymerization of unsaturated amides to form useful polymeric lubricating oil additives. This patent is exemplary of the state of the polymerization art in that it teaches the polymerization reaction in the presence of a peroxide catalyst. It has been known for some time that peroxide-catalysts tend to be poisoned by nitrogen compounds and it is generally desirable to use azo type compounds as catalysts, such as, for example, alpha, alpha[1] azodiisobutyronitrile. These catalysts, while efficient, are very expensive.

It has now been found that polymerization of unsaturated nitrogen compounds and copolymerization of these materials with other polymerizable materials such as unsaturated esters, may be carried out at low temperatures and desirable copolymers are obtained in relatively short periods of time by exposing the monomers to the effect of radiation emitted by sources of high energy radio activity.

In accordance with the present invention, copolymers of the type referred to above are prepared by subjecting a mixture of an unsaturated nitrogen compound and an unsaturated ester to high energy radioactive radiation for a relatively short period of time sufficient to effect the desired degree of copolymerization. Types of radiation suitable for the purposes of invention include high energy electromagnetic radiation, such as gamma rays and X-rays and high velocity electrons, such as beta rays, as well as alpha particles.

These types of radiation may be supplied by naturally occurring radioactive materials, such as radium and its compounds, which emit alpha, beta and gamma rays. Fission by-products of processes generating atomic power and/or fissionable materials which emit high energy gamma rays, afford a highly desirable and most abundant source of radioactivity suitable for the purposes of the invention. These by-products include elements with atomic numbers ranging from 30 (zinc) to 63 (europium) and their compounds. They are formed in the course of converting uranium, thorium and other fissionable material in an atomic reactor.

Materials made radioactive by exposure to neutron radiation, such as radioactive cobalt ($Co^{60}$), europium 152 or europium 154 which emit gamma rays, may likewise be used. Suitable sources of high velocity electrons are the beams of electron accelerators, such as the Van de Graaf generator or the betatron. In general, however, high intensity gamma radiation and its well-known sources, such as nuclear fission by-products and materials made radio active by neutron radiation are preferred for the purposes of the invention mainly because of the relatively high penetrating power of the gamma rays and the availability and ease of application of these sources of gamma radiation.

It has been found that unsaturated esters of the type here involved may be copolymerized with unsaturated nitrogen compounds to form valuable viscosity index improvers by exposure to radiation of the type specified above quite generally at temperatures substantially below 100° F. and usually at room temperatures of, say, about 60° to 80° F. Radiation time and intensity largely depend on the degree of copolymerization, i. e., molecular weight, desired for the end product. Within the broad operable ranges of a few seconds to 48 hours, say about 2 to 10 hours' radiation time and about 10,000 to 5,000,000 Roentgen per hour (R./hr.) radiation intensity, copolymer molecular weight of any desired magnitude ranging, say, from 1,000 to 100,000 Staudinger or more may be produced. Conversion is the higher the longer the radiation time and the higher the radiation intensity, resulting in higher viscosities of the reaction product. It has been found, however, that excessive irradiation time causes molecular breakdown of the polymer or copolymer formed, so an irradiation time as short as is conducive to the formation of valuable polymers or copolymers should be used.

Conditions suitable for the production of most lubricating oil additives coming within the scope of this invention include temperatures of about 0° to 150° F., radiation times of about 0.5 to 48 hours, preferably about 2 to 10 hours, and radiation intensities of about 10,000 to 5,000,000 R./hr., preferably about 200,000 to 500,000 R./hr. Desirable molecular weights fall within the broad range of about 1,000 to 100,000 Staudinger; usually they range between about 2,000 and 50,000 Staudinger. Preferred molecular weights are about 5,000 to 25,000 or 30,000 Staudinger. These preferred molecular weight ranges correspond to intrinsic viscosities of about 0.15 to 1.0. Polymers in these molecular weight ranges, when blended at about 1% concentration with a typical lubricating oil base stock originally having a viscosity of 45 SUS at 210° F., give blends with viscosities in the range of about 50 to 70 SUS at 210° F.

The process of the invention has several important advantages. Copolymerization by means of radioactive irradiation is less expensive than copolymerization by means of conventional chemical procedures, such as peroxide catalysis. In addition, this process possesses the following advantages:

1. High temperatures are not required to initiate the copolymerization reaction. This means that the copolymerization may be carried out at ambient temperature without providing heat for the process. With peroxide initiated copolymerization, the reaction mixture must be heated to a temperature range in which the peroxide will decompose. In using benzoyl peroxide, one of the more common methods for initiating commercial copolymerization reactions, it is necessary to heat the reactants to the neighborhood of 120° to 200° F. for polymerization to occur.

2. The reaction is easily controlled. With peroxide copolymerization catalysts, the rate at which the chain initiators is produced depends not only upon the concentration of the peroxide and the temperature, but also upon little understood secondary chemical changes in the peroxide decomposition products. The rate at which chain initiating gamma rays are produced by the radioactive source is constant. Therefore, at a given temperature the copolymerization will be quite even and not subject to sudden acceleration or deceleration as is the case with peroxide catalysts. Also, with conventional peroxide catalysis it is necessary to heat the reaction mixture to initiate the copolymerization process after which rapid cooling may be required so that the polymerization does not get out of control. Difficult control problems of this type are avoided in accordance with the invention. As a result, the products have a more uniform molecular weight range which will result in quality advantages such as better shear stability. Another effect of this regular reaction rate is the production of a clear, water-white product which is superior in appearance to that produced by conventional chemical methods.

3. There is no catalyst contamination in the products copolymerized by gamma irradiation. Since the radioactive material need not come in direct contact with the reactants, and since the gamma rays themselves are merely particles of light, the problem of removing initiating materials from the resulting polymer does not exist. The absence of catalyst contamination in the final product results in greater thermal stability of the copolymer. It should be pointed out that gamma ray irradiation does not make a substance radioactive.

4. Radiation initiation is readily adaptable for continuous copolymerization processes. Since the irradiation is given out on a 24 hour basis from an irradiation source, and since its emission is regular and not affected by temperature or other outside phenomena, the catalytic effect is controlled in radiation initiated copolymerizations solely by the time of residence of the reactant within the irradiation zone. For all practical purposes, the initiator is not consumed as is the case with chemical initiators. In addition, a radiation source, such as a gamma source, produces no products which must be removed from the reaction zone. These features permit the design of a plant which can manufacture polymer on a 24 hour basis by merely pumping monomers through the radiation given out by a suitable source.

As generally described above, the improved process of this invention relates to a process for the polymerization of unsaturated nitrogen compounds or copolymerization of these materials with other polymerizable materials, such as unsaturated esters.

The unsaturated nitrogen compounds contemplated for use in the process of invention may broadly be described as nitrogen compounds having the general formula

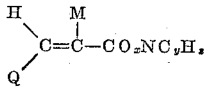

wherein Q is a hydrogen atom, an ester group, or the group $—CO_xNC_yH_z$, wherein M is a hydrogen atom, an aliphatic group, an aromatic group, an ester group, or a halogen atom, wherein $x$ is 0, 1 or 2, wherein $y$ is a whole number, and wherein $z$ is equal to $2y+2$, provided that when $x$ is zero, $y$ and $z$ are also zero. Compounds covered by the formula include acrylamides such as methyl acrylamide, butyl acrylamide, octyl acrylamide, etc., methacrylamides, such as butylmethacrylamide, octyl methacrylamide, etc., amino methacrylates, such as the methacrylate of ethanolamine, or N-N di ethanolamine, etc., other amino esters, such as the unsaturated acid esters of amino alcohols, etc., and acrylonitrile. Preferred nitrogen containing compounds include the alkyl acrylamides such as the $C_4$ to $C_{18}$ alkyl acrylamides, the di-alkyl amino methacrylates such as the $C_2$ to $C_8$ di-alkyl compounds and acrylonitrile.

The unsaturated ester monomer which may be copolymerized with the unsaturated amide may be any represented by the following formula

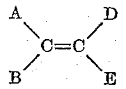

wherein:

(1) A and D are carboxylic acid ester groups $$-\overset{\overset{\displaystyle O}{\|}}{C}OR$$

and B and E are hydrogen, i. e., fumaric acid esters, maleic acid esters, etc.

(2) A and D are carboxylic acid ester groups, as above, and either B and E is a methyl group, the other being hydrogen, i. e., citraconic acid esters, mesaconic acid esters, etc.

(3) A and B are hydrogen, D is a carboxylic acid ester group, as above, and E is a methylene carboxylic acid ester group, i. e., itaconic acid esters, etc.

(4) A and D are carboxylic acid ester groups as above, E is a methylene carboxylic acid ester group and B is hydrogen, i. e., aconitic acid esters, etc.

(5) A, B and D are hydrogen and E is an ester group as above, i. e., vinyl acetate, vinyl butyrate, vinyl laurate and the like.

(6) A and B are hydrogen, D is a methyl group, and E is an ester group as described above, i. e., isopropenyl acetate, etc.

(7) A and B are hydrogen, D is hydrogen or a methyl group and E is a carboxylic acid ester group as above, i. e., acrylic and methacrylic acid esters.

Of the operable monomers covered by the above, the preferred embodiments are the esters of acrylic and methacrylic acid containing from about 3 to 20 carbon atoms in the ester group. Particularly desirable are the acid esters of branched chain alcohols produced by the well known catalytic oxonation of $C_7$ to $C_{12}$ olefins with CO and $H_2$, and the commercial mixture of alcohols obtained by the hydrogenation of coconut oil, said mixture containing $C_8$ to $C_{18}$ alcohols.

In some cases, it is desirable to dilute the reagents during the reaction with a suitable solvent which is substantially inert to gamma irradiation, such as a saturated hydrocarbon, carbon tetrachloride or dioxane. In this manner, cross-linking of the polymer to form oil-insoluble gels is inhibited and the product is obtained in a readily usable form.

The copolymers prepared in accordance with the invention may be used as lubricating oil additives in concentrations of about 0.001 to 10 weight percent, preferably about 0.01 to 5 weight percent.

The oil base stocks in which the copolymers of the invention may be used may be paraffinic or naphthenic lubricating oils which normally require improving additives. These oils are preferably of lubricating oil grade having viscosities of about 35 to 150 S. U. S. at 210° F. The polymers and copolymers may also be added to greases, paraffin wax or waxy compositions, lighter hydrocarbon oils, such as diesel fuel base stocks requiring pour depressing or other light oils including domestic heating oil base stocks, mineral seal oil, kerosene, etc.

Oil compositions containing the copolymers of the invention may be further improved by the addition of conventional modifying agents, such as dyes, anti-oxidants, tackiness agents, etc., or of other types of pour depressors, such as wax-naphthalene condensation products, wax-phenol condensation products as well as other viscosity index improvers, such as polybutenes, polyvinyl ethers, etc.

Conventional means of irradiating materials with radioactive radiation may be employed to carry out the process of the invention. For example, batches of the reaction mixtures may be inserted in or reactant streams passed through pipes made of or containing the radioactive material and shielded from the outside to protect the operator. Another suitable arrangement is described in the copending Black and Hill application, Serial No. 368,972, filed July 20, 1953, and assigned to the same interests as the present application. In accordance with this procedure, the radioactive materials are stored in the bottom of a concrete or metal-lined pit which is filled with water to a level sufficient to absorb the radiation being emitted. The radioactive materials may be held in metal containers or under a thin layer of concrete to prevent direct contact with the water. The reactants may either be lowered in batches into the pit or passed through pipes through the pit in a position in which they are adequately exposed to the radiation emitted by the radioactive materials. The water acts as a shield protecting the operator above the pit against radiation. No radiation passes through the ground around the pit. Other suitable means for carrying out the process of the invention may appear to those skilled in the art.

The invention will be further illustrated by the following specific examples.

EXAMPLE 1

A mixture of 47.5 g. of a methacrylic acid ester of a $C_8$ Oxo alcohol prepared by the oxonation of a $C_7$ olefin in the Oxo process and 2.5 g. of an N-octyl acrylamide was dissolved in 50.0 g. of a highly refined white mineral oil having a viscosity of 42 S. S. U. at 210° F. to form a solution. The solution of these monomers was exposed to the radiation emitted by radioactive Cobalt ($Co^{60}$). The sample was placed in a sealed glass container contained in an aluminum canister. This canister was then introduced into the center of a pipe of the radioactive cobalt. The samples were exposed to a radiation intensity of about 235,000 R./hr. at about 70° F. for 8 hours. The resulting product was a completely homogeneous, water-white, viscous blend of the copolymer in the white oil.

EXAMPLE 2

The above example was repeated using an irradiation time of 24 hours.

The two samples were blended with a lubricating oil having a viscosity at 210° F. of 45.7 S. U. S. in 3.6 weight percent blends of the active ingredient. Results are set out in Table I below. Included in the table are the results obtained on similar blends prepared with a polymerized methacrylate ester having about 10 carbon atoms in the ester grouping which was prepared by the prior art process using benzoyl peroxide as catalyst.

From the table it will be seen that the copolymer prepared with 8 hour irradiation time is superior to the commercially available viscosity index improver. It will also be seen that there is a slight breakdown of the polymeric material when subjected to irradiation times longer than about 10 hours.

TABLE I

*Copolymers as viscosity index improvers*

| Ex. No. | Copolymer Composition | Solvent | Irradiation Conditions [1] | | 3.6 wt. percent Blends in Oil A [2] | | |
|---|---|---|---|---|---|---|---|
| | | | ° F. | Hours | SUS/100° F. | SUS/210° F. | V. I. |
| | **(A) SUBSTITUTED ACRYLAMIDE COPOLYMER** | | | | | | |
| 1 | 47.5 $C_8$ Methacrylate; 2.5 N Octyl Acrylamide | 50.0 White Oil | 70 | 8 | 330.9 | 71.3 | 148.8 |
| 2 | 47.5 $C_8$ Methacrylate; 2.5 N Octyl Acrylamide | do | 70 | 24 | 303.7 | 65.0 | 145.7 |
| 3 | 47.5 $C_8$/Lorol [3] Methacrylate; 2.5 N Octyl Acrylamide | 10.0 White Oil | 70 | 8 | 404.1 | 84.1 | 148.9 |
| 4 | 47.5 $C_8$/Lorol [3] Methacrylate; 2.5 N Octyl Acrylamide | do | 150 | 5 | 486.5 | 100.2 | 148.2 |
| 5 | 40.0 Lorol [3] Methacrylate; 10.0 N Butyl Acrylamide | 30.0 Isopropyl Alcohol | 70 | 8 | 476.0 | 89.2 | 144.7 |
| | **(B) AMINO METHACRYLATE COPOLYMERS** | | | | | | |
| 6 | 45.0 $C_{10}$ Methacrylate; 5.0 N,N Diethylamino Methacrylate | 10.0 White Oil | 70 | 8 | 515.8 | 105.0 | 148.0 |
| 7 | 45.0 $C_8$/Lorol [3] Methacrylate; 5.0 N,N Diethylamino Methacrylate | 20.0 White Oil | 70 | 8 | 550.2 | 101.5 | 144.0 |
| | Commercial Methacrylate Copolymer | | | | 355.0 | 73.8 | 147.2 |
| | Oil A, no additive | | | | 174.0 | 45.7 | 113.0 |

[1] Dosage about 235,000 R./hr.
[2] Extracted Mid-Continent stock of 45.7 SUS/210° F.
[3] Lorol methacrylate is a mixture of $C_8$ to $C_{18}$ methacrylates having an average molecular weight of 275.

EXAMPLES 3 TO 7

Preparation details and viscosity index improvement by these copolymers are given in Table I. The copolymer prepared in Example 5 was a potent pour depressant (as well as viscosity index improver) as shown in Table II.

EXAMPLE 8

A mixture of 38.0 g. of di-Lorol fumarate, 9.5 g. of vinyl acetate, and 2.5 g. of N,N diethylamino methacrylate was irradiated as in Example 1 at about 70° F. for 24 hours. Di-Lorol fumarate is a mixture of products gotten by esterifying a mixture of $C_8$ to $C_{18}$ alcohols having an average molecular weight of 207. The copolymer product was an active pour depressant as shown in Table II. (This product also proved to be of value as a stabilizer for a middle distillate heating oil, in that it reduced formation of sludge).

TABLE II

| Ex. No. | Copolymer Composition | Weight Percent Concentration | ASTM Pour Point, °F., Mid-Continent Stocks | | |
|---|---|---|---|---|---|
| | | | SAE 10 | SAE 20 | SAE 30 |
| 5 | Lorol Methacrylate, N Butyl Acrylamide. | 0.00 | +15 | +15 | +15 |
| | | 0.01 | −10 | +15 | +15 |
| | | 0.02 | −15 | +5 | +15 |
| | | 0.05 | <−35 | −20 | −5 |
| | | 0.20 | <−35 | −30 | −5 |
| 8 | Lorol Fumarate, Vinyl Acetate, N,N Diethylamino Methacrylate. | 0.00 | +10 | +15 | +15 |
| | | 0.01 | 0 | +15 | +15 |
| | | 0.02 | 0 | −15 | +5 |
| | | 0.05 | −10 | −20 | −15 |
| | | 0.20 | <−35 | −20 | −20 |

EXAMPLE 9

A mixture of 40 g. of $C_8$/Lorol methacrylate and 10 g. of acrylonitrile in 50 g. of a white oil was irradiated under conditions similar to Example 1 for 8 hours at 70° F. A blend containing 0.4 weight percent of the copolymer product in a highly naphthenic oil gave the following results:

| Oil Blend | SUS/100° F. | SUS/210° F. | V. I. |
|---|---|---|---|
| Naphthenic Oil, no additive | 81.5 | 36.6 | 32.1 |
| Same Oil + 0.4 weight percent Methacrylate-Acrylonitrile Copolymer | 90.8 | 38.1 | 73.3 |

EXAMPLE 10

A mixture of 90.4 g. of Lorol fumarate and 9.6 g. acrylonitrile were irradiated as in Example 1. The product was a pour depressant as shown in Table III.

EXAMPLE 11

This is similar to Example 10 except Lorol maleate was substituted for Lorol fumarate. Pour data are given in Table III.

TABLE III

*Acrylonitrile copolymers as pour depressants*

| Weight Percent Copolymer | ASTM Pour Point, ° F., in Mid-Continent SAE 20 Stock, Using Copolymer Indicated | |
|---|---|---|
| | Example 10 | Example 11 |
| 0.00 | +15 | +15 |
| 0.01 | +15 | +15 |
| 0.02 | +5 | +15 |
| 0.05 | −5 | +10 |
| 0.20 | −20 | −15 |
| 0.40 | −20 | −30 |

To summarize briefly, the instant invention relates to new and improved viscosity index improvers and pour point depressors, to a process for their preparation and to lubricating oil compositions containing them. Briefly, the copolymers of the invention are prepared by subjecting to the action of high intensity gamma radiation in the order of from about 10,000 to about 5,000,000 R./hr., preferably from about 200,000 to about 300,000 R./hr., at temperatures of about 0° to about 150° F. for a period of time of from about 0.5 to about 48 hours, preferably from about 2 to about 10 hours, a mixture of two unsaturated monomers.

The first monomer, which may be broadly described as being an unsaturated nitrogen containing carbon compound, is utilized in proportions from about 0.1 to about 10 weight percent, based on the weight of the total monomer, preferably from about 0.5 to about 5.0 weight percent. This monomer has the generic formula

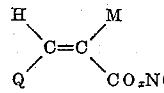

In the formula, Q is selected from the group consisting of hydrogen atoms, the group —COOR, R being an aliphatic group containing from 3 to 20 carbon atoms, preferably from 8 to 18 carbon atoms, and the group —$CO_xC_yH_z$. M of the formula is selected from the group consisting of hydrogen atoms, aliphatic groups, aromatic groups, halogen atoms and the group —COOR. $x$ of the formula is either 0, 1 or 2. $y$ is a whole number and $z$ is equal to $2y+2$. When $x$ is 0, however, $y$ and $z$ are both 0.

This nitrogen containing monomer is copolymerized with an unsaturated ester monomer of the formula

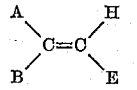

In this formula, A and E are selected from the group consisting of hydrogen atoms and the group COOR, R being an alkyl group containing from 3 to 20 carbon atoms, preferably from 8 to 18 carbon atoms. B of the formula is selected from the group consisting of hydrogen atoms, methyl groups and —COOR groups.

The polymeric material has a molecular weight within the range of from about 2,000 to 50,000 Staudinger and preferably from about 5,000 to about 30,000 Staudinger. Preferred among the unsaturated nitrogen containing carbons which are operable in the concept of this invention are materials such as acrylamides, for example methacrylamides, butylacrylamides, octylacrylamides and the like, the amino methacrylates such as the methacrylates of ethanol amine, N-N-di ethanolamine and the like, the unsaturated acid esters of amino alcohols, acrilonitrile and the like.

Preferred among the unsaturated ester monomers are those esters of acrylic and methacrylic acid containing from about 3 to about 20 carbon atoms, preferably from about 8 to about 18 carbon atoms in the ester group. Especially preferred are the acid esters of those branched chain alcohols produced by the catalytic oxonation of $C_7$ to $C_{12}$ olefins. The copolymers may be blended with lubricating oils in amounts between about 0.001 to about 10.0 weight percent, preferably from about 0.01 to about 5.0 weight percent. Other additive materials may also be blended with the lubricating compositions containing these copolymers. Such materials as other viscosity index improvers, other pour point depressants, detergent inhibitors, corrosion inhibitors, oxidation inhibitors and the like are compatible with the copolymers described above.

What is claimed is:

1. A method of producing lubricating oil additive materials which comprises exposing a mixture of (1) an unsaturated nitrogen-containing compound selected from the group consisting of alkyl acrylamides having an alkyl group containing from 4 to 8 carbon atoms, dialkyl amino methacrylates having alkyl groups containing from 2 to 8 carbon atoms, and acrylonitrile with (2) an unsaturated organic ester having from 3 to 20 carbon atoms, to gamma radiation of intensity between about $10^4$ and $5\times10^6$ roentgens per hour, for a time sufficient to form a copolymer having a molecular weight within the range of from $2\times10^3$ to $5\times10^4$ Staudinger, said copolymer having the characteristic of improving the viscosity index and lowering the pour point of mineral lubricating oils with which they are blended.

2. The method of claim 1 wherein said unsaturated organic ester is prepared by the esterification of an acid selected from the group consisting of acrylic acid and methacrylic acid with an alcohol selected from the group consisting of branched chain alcohols produced by the catalytic reaction of $C_7$ to $C_{12}$ olefins with carbon monoxide and hydrogen and the commercial mixture of alcohols having 8 to 12 carbon atoms obtained by the hydrogenation of coconut oil.

3. A method of producing valuable lubricating oil additive materials which comprises exposing to gamma radiation of about 200,000 to 300,000 roentgens per hour at a temperature substantially below 150° F. for from about 2 to about 10 hours a mixture of from 0.5 to 5.0 weight percent of a material of the formula

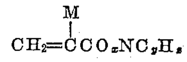

wherein M is selected from the group consisting of hydrogen atoms and methyl groups, wherein $x$ is 1, wherein $y$ is 6 to 18 and where $z$ is $2y+2$, with a material of the formula

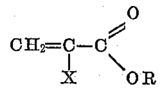

wherein R is an alkyl group containing from 3 to 20 carbon atoms and wherein X is selected from the group of hydrogen atoms and methyl groups, said copolymer having a molecular weight within the range of from 5,000 to 30,000 Staudinger.

4. A method of producing lubricating oil additive material which comprises exposing a mixture of 47.5 grams of a methacrylic acid ester of a $C_8$ branched chain alcohol and 2.5 grams of N-octyl acrylamide dissolved in 50 grams of a highly refined white mineral oil to gamma irradiation at a radiation intensity of about $2\times10^5$ roentgens per hour, at a temperature substantially below 150° F. for 8 hours.

5. A method of producing a lubricating oil additive material which comprises exposing a major proportion of $C_8$ to $C_{18}$ methacrylates having an average molecular weight of 275 admixed with a minor proportion of acrylonitrile to gamma irradiation at a radiation intensity of about $2 \times 10^5$ roentgens per hour, and at a temperature substantially below 150° F.

References Cited in the file of this patent

UNITED STATES PATENTS

| | | |
|---|---|---|
| 2,387,501 | Dietrich | Oct. 23, 1945 |
| 2,666,044 | Catlin | Jan. 12, 1954 |

FOREIGN PATENTS

| | | |
|---|---|---|
| 665,262 | Great Britain | Jan. 23, 1952 |
| 1,079,401 | France | May 19, 1954 |

OTHER REFERENCES

"Symposium on Utilization of Radiation from Fission Products," Hartwell, an A. E. R. E. report, Feb. 23–24, 1953, pages 116 and 117.

"Nature," April 15, 1939, vol. 143, page 640.